United States Patent
Witt et al.

(10) Patent No.: US 6,393,546 B1
(45) Date of Patent: May 21, 2002

(54) PHYSICAL RENAME REGISTER FOR EFFICIENTLY STORING FLOATING POINT, INTEGER, CONDITION CODE, AND MULTIMEDIA VALUES

(75) Inventors: David B. Witt, Austin, TX (US); James B. Keller, Palo Alto, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/788,067

(22) Filed: Feb. 16, 2001

Related U.S. Application Data

(63) Continuation of application No. 09/225,982, filed on Jan. 5, 1999, now Pat. No. 6,266,736.

(51) Int. Cl.$^7$ .............................................. G06F 12/02
(52) U.S. Cl. ...................................... 712/36; 711/210
(58) Field of Search ............................. 712/36, 23, 41; 711/210, 202, 207, 153

(56) References Cited

U.S. PATENT DOCUMENTS

| | | | | |
|---|---|---|---|---|
| 5,179,702 A | | 1/1993 | Spix ............................ 709/102 |
| 5,499,352 A | * | 3/1996 | Clift et al. ................... 711/202 |
| 5,630,149 A | | 5/1997 | Bluhm ......................... 712/217 |
| 5,632,023 A | | 5/1997 | White et al. ................. 712/218 |
| 5,651,124 A | * | 7/1997 | Shen et al. .................. 712/215 |
| 5,651,125 A | | 7/1997 | Witt et al. ................... 514/182 |
| 5,784,589 A | | 7/1998 | Bluhm ......................... 712/217 |
| 5,805,853 A | | 9/1998 | White et al. ................. 712/218 |
| 5,826,094 A | * | 10/1998 | Colwell et al. ............. 712/217 |
| 5,878,244 A | | 3/1999 | Witt et al. ................... 712/218 |
| 5,884,059 A | | 3/1999 | Favor et al. ................ 712/215 |
| 5,978,901 A | * | 11/1999 | Luedtke et al. ............. 708/495 |
| 6,119,223 A | * | 9/2000 | Witt .............................. 709/1 |
| 6,122,656 A | | 9/2000 | Witt ........................... 709/100 |
| 6,195,746 B1 | * | 2/2001 | Nair ............................ 712/210 |
| 6,230,262 B1 | * | 5/2001 | Witt ........................... 709/100 |
| 6,240,502 B1 | * | 5/2001 | Panwar et al. ................ 712/15 |

* cited by examiner

Primary Examiner—Eric Coleman
(74) Attorney, Agent, or Firm—Conley, Rose & Tayon, PC; Lawrence J. Merkel

(57) ABSTRACT

A register renaming apparatus includes one or more physical registers which may be assigned to store a floating point value, a multimedia value, an integer value and corresponding condition codes, or condition codes only. The classification of the instruction (e.g. floating point, multimedia, integer, flags-only) defines which lookahead register state is updated (e.g. floating point, integer, flags, etc.), but the physical register can be selected from the one or more physical registers for any of the instruction types. Determining if enough physical registers are free for assignment to the instructions being selected for dispatch includes considering the number of instructions selected for dispatch and the number of free physical registers, but excludes the data type of the instruction. When a code sequence includes predominately instructions of a particular data type, many of the physical registers may be assigned to that data type (efficiently using the physical register resource). By contrast, if different sets of physical registers are provided for different data types, only the physical registers used for the particular data type may be used for the aforementioned code sequence. Additional efficiencies may be realized in embodiments in which an integer register and condition codes are both updated by many instructions. One physical register may concurrently represent the architected state of both the flags register and the integer register. Accordingly, a given functional unit may forward a single physical register number for both results.

19 Claims, 10 Drawing Sheets

PHYSICAL RENAME REGISTER FOR EFFICIENTLY STORING FLOATING POINT, INTEGER, CONDITION CODE, AND MULTIMEDIA VALUES

This application is a continuation of U.S. patent application Ser. No. 09/225,982, now U.S. Pat. No. 6,266,736 filed on Jan. 5, 1999.

BACKGROUND OF THE INVENTION

1. Field of the Invention

This invention is related to the field of processors and, more particularly, to register renaming mechanisms within processors.

2. Description of the Related Art

Superscalar processors attempt to achieve high performance by dispatching and executing multiple instructions per clock cycle, and by operating at the shortest possible clock cycle time consistent with the design. To the extent that a given processor is successful at dispatching and/or executing multiple instructions per clock cycle, high performance may be realized.

One technique often employed by processors to increase the number of instructions which may be executed concurrently is speculative execution (e.g. executing instructions out of order with respect to the order of execution indicated by the program or executing instructions subsequent to predicted branches). Often, instructions which are immediately subsequent to a particular instruction are dependent upon that particular instruction (i.e. the result of the particular instruction is used by the immediately subsequent instructions). Hence, the immediately subsequent instructions may not be executable concurrently with the particular instruction. However, instructions which are farther subsequent to the particular instruction in program order may not have any dependency upon the particular instruction and may therefore execute concurrently with the particular instruction. Still further, speculative execution of instructions subsequent to mispredicted branches may increase the number of instructions executed concurrently if the branch is predicted correctly.

Out of order execution gives rise to another type of dependency, often referred to as an "antidependency". Generally, antidependencies occur if an instruction subsequent to a particular instruction updates a register which is either accessed (read) or updated (written) by the particular instruction. The particular instruction must read or write the register prior to the subsequent instruction writing the register for proper operation of the program. Generally, an instruction may have one or more source operands (which are input values to be operated upon by the instructions) which may be stored in memory or in registers. An instruction may also have one or more destinations (which are locations for storing results of executing the instruction) which may also be stored in memory or in registers.

A technique for removing antidependencies between source and destination registers of instructions, and thereby allowing increased out of order execution, is register renaming. In register renaming, a pool of "rename registers" are implemented by the processor. The pool of rename registers are greater in number than (i) the registers defined by the instruction set architecture employed by the processor (the "architected registers") and (ii) the registers employed for temporary use, such as by microcode routines (the "temporary registers"). Together, the architected registers and temporary registers are referred to as the "logical registers". The destination register for a particular instruction (i.e. the logical register written with the execution result of the instruction) is "renamed" by assigning one of the rename registers to the logical register. The value of the logical register prior to execution of the particular instruction remains stored in the rename register previously assigned to the logical register. If a previous instruction reads the logical register, the previously assigned rename register is read. If a previous instruction writes the logical register, the previously assigned rename register is written. Accordingly, the rename registers may be updated in any order.

Register renaming may also allow speculative update of registers due to instruction execution subsequent to a predicted branch instruction. Previous renames may be maintained until the branch instruction is resolved. If the branch instruction is mispredicted, the previous renames may be used to recover the state of the processor at the mispredicted branch instruction.

In many instruction set architectures, a variety of architected registers are provided for storing instruction results of varying types. For example, integer, floating point, multimedia, and condition code registers may be defined. Integer registers are employed for storing integer values (i.e. whole number values represented by the magnitude of the value stored in the registers). Floating point registers are employed for storing the floating point values (i.e. numbers represented by a sign, exponent, and significand stored in the register). Multimedia registers are used for storing multimedia values (e.g. packed integer or floating values representing audio and video information, operated upon in a single instruction, multiple data (SIMD) fashion). Finally, condition code registers store values which indicate the result of a particular manipulation (e.g. zero, greater than or less than zero, carry out) or comparison (e.g. equal, greater than, less than). Condition codes may also be referred to herein as "flags".

Each of the various types of registers may have a different size than the others. For example, in the x86 instruction set architecture, floating point registers are 80 bits wide, multimedia registers are 64 bits wide, integer registers are 32 bits wide (and subdivided into independently addressable portions), and the condition codes are stored in an EFLAGS register but comprise 6 bits. Accordingly, processors typically rename each register type separately with register renames of the corresponding size. Unfortunately, rename registers of a particular type may be idle if instructions manipulating that type are not being executed. For example, floating point renames are idle if floating point instructions are not being executed. The total amount of available rename register space may therefore by inefficiently used much of the time.

Furthermore, in the x86 instruction set architecture many integer instructions update both a destination and the condition codes. Therefore, multiple rename registers may need to be assigned to each instruction. Register rename logic complexity may therefore be significant. Accordingly, a more efficient and simpler register rename scheme is desired.

SUMMARY OF THE INVENTION

A register renaming apparatus, according to one embodiment, includes one or more rename registers (referred to herein as physical registers) which may be assigned to store any of: a floating point value, a multimedia value, an integer value and corresponding condition codes, or condition codes only. For physical register assignment, an instruction is classified as being floating point (e.g. having a floating point register as a destination), multimedia (e.g. having a multimedia register as a destination), integer (e.g. having an integer register and the flags register as destinations), or a flags-only (e.g. having the flags register as a destination). The classification of the instruction defines which lookahead register state is updated (floating point, integer, flags, etc.), but the physical register can be selected from the one or more physical registers for any of the instruction types. Advantageously, determining which physical register to select may be simplified over an implementation which employs separate sets of physical registers for each data type. For example, part of the register renaming logic is to determine if enough physical registers are free for assignment to the instructions being selected for dispatch. In an implementation employing different physical registers for different data types, this determination includes determining the data type of each instruction (to determine how many physical registers of each type are needed). Instead, the register renaming apparatus described below considers the number of instructions selected for dispatch and the number of free physical registers.

Additionally, an embodiment of the register renaming apparatus described herein may make more efficient use of the physical registers. For example, when a code sequence includes predominately instructions of a particular data type, many of the physical registers may be assigned to that data type. By contrast, if different sets of physical registers are provided for different data types, only the physical registers used for the particular data type may be used for the aforementioned code sequence. The other physical registers sit idle during such code sequences. Performance may be increased due to the more efficient use of the physical registers by allowing more of the instructions of the particular data type to be concurrently outstanding. Still further, additional efficiencies may be realized in embodiments in which an integer register and condition codes are both updated by many instructions (e.g. the x86 instruction set architecture exhibits this feature). Because the physical registers described herein are adaptable to store both an integer value and a condition code value, one physical register may concurrently represent the architected state of both the flags register and the integer register. In embodiments which maintain separate sets of physical registers, two registers are assigned in such cases.

Broadly speaking, an apparatus for performing register renaming is contemplated. The apparatus comprises a physical register and a map unit. The map unit is configured to assign the physical register to store a floating point value during a first clock cycle. Additionally, the map unit is configured to assign the physical register to store an integer value and a corresponding condition code during a second clock cycle.

Additionally, a method for performing register renaming is contemplated. A physical register is assigned to store a floating point value responsive to dispatching a floating point instruction. The physical register is assigned to store an integer value and a corresponding condition code responsive to dispatching an integer instruction.

Moreover, a processor is contemplated. The processor comprises an instruction cache, a register file, and a map unit. The instruction cache is configured to store a plurality of instructions. The processor is configured to fetch the plurality of instructions from the instruction cache. The register file comprises physical registers. Coupled to receive the plurality of instructions from the instruction cache, the map unit is configured to assign one of the physical registers within the register file to one of the plurality of instructions upon dispatch of the plurality of instructions to the map unit. The one of the physical registers is adaptable to store a floating point value if the one of the plurality of instructions is a floating point instruction. Additionally, the one of the physical registers is adaptable to store an integer value and a corresponding flags value if the one of the plurality of instructions is an integer instruction.

Still further, a register renaming apparatus is contemplated. The register renaming apparatus comprises a physical register and a map unit. The map unit is configured to assign the physical register to a first logical register of a first data type specified as a destination of a first instruction during a first clock cycle. Additionally, the map unit is configured to free the physical register during a second clock cycle in which a second instruction subsequent to the first instruction is retired and the second instruction has the first logical register of the first data type as a destination. The map unit is configured to assign the physical register to a second logical register of a second data type different than the first data type during a third clock cycle subsequent to the second clock cycle.

A method for performing register renaming is contemplated. A physical register is assigned to a first logical register of a first data type. The first logical register is specified as a destination of a first instruction. A second instruction subsequent to the first instruction in program order is retired. Responsive to the retiring, the physical register is freed. The physical register is assigned to a second logical register of a second data type different than the first data type subsequent to being freed.

BRIEF DESCRIPTION OF THE DRAWINGS

Other objects and advantages of the invention will become apparent upon reading the following detailed description and upon reference to the accompanying drawings in which.

Figure 1:
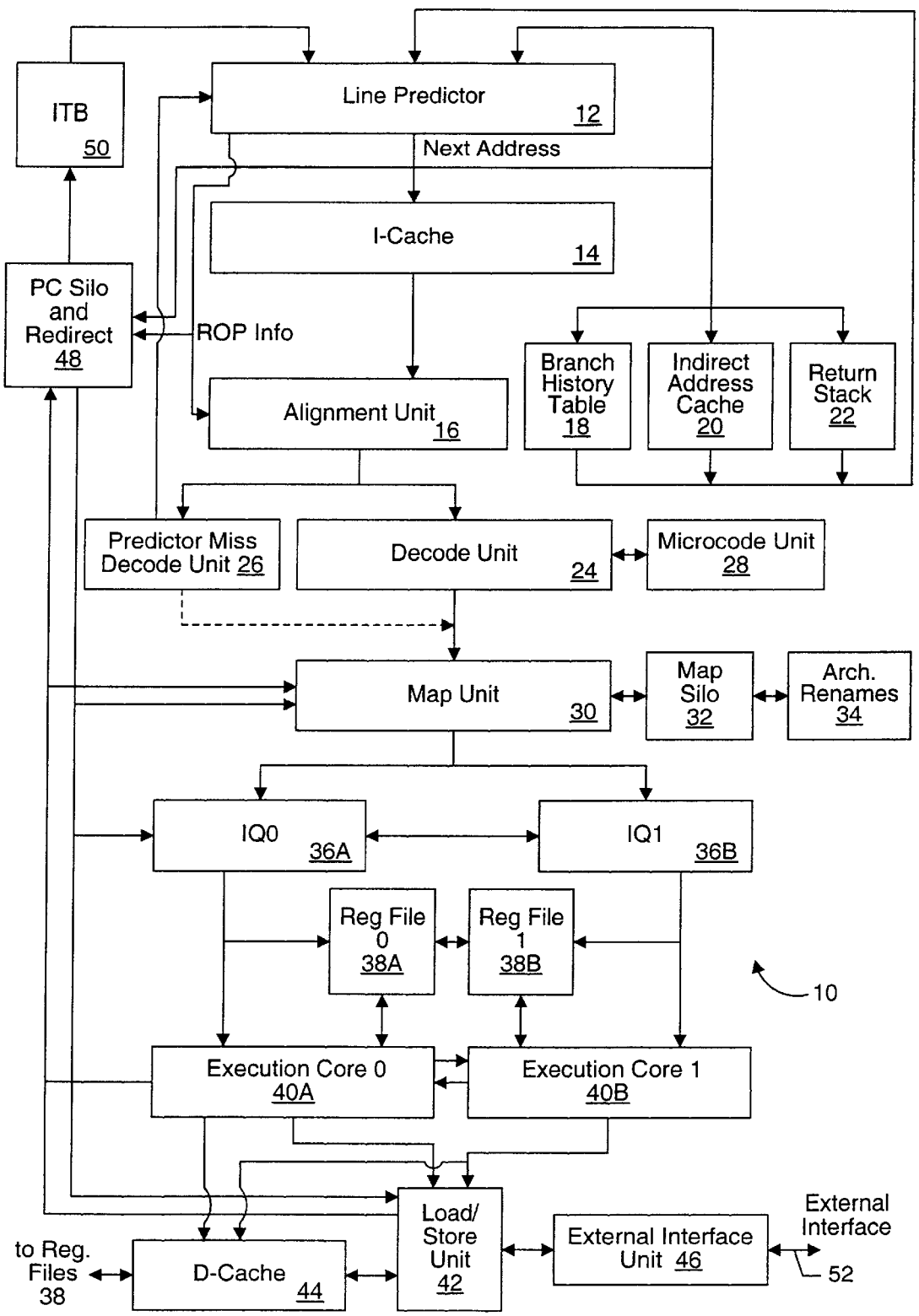
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch history table 18, an indirect address cache 20, a return stack 22, a decode unit 24, a predictor miss decode unit 26, a microcode unit 28, a map unit 30, a map silo 32, an architectural renames block 34, a pair of instruction queues 36A–36B, a pair of register files 38A–38B, a pair of execution cores 40A–40B, a load/store unit 42, a data cache (D-cache) 44, an external interface unit 46, a PC silo and redirect unit 48, and an instruction TLB (ITB) 50. Line predictor 12 is connected to ITB 50, predictor miss decode unit 26, branch history table 18, indirect address cache 20, return stack 22, PC silo and redirect block 48, alignment unit 16, and I-cache 14. I-cache 14 is connected to alignment unit 16. Alignment unit 16 is further connected to predictor miss decode unit 26 and decode unit 24. Decode unit 24 is further connected to microcode unit 28 and map unit 30. Map unit 30 is connected to map silo 32, architectural renames block 34, instruction queues 36A–36B, load/store unit 42, execution cores 40A–40B, and PC silo and redirect block 48. Instruction queues 36A–36B are connected to each other and to respective execution cores 40A–40B and register files 38A–38B. Register files 38A–38B are connected to each other and respective execution cores 40A–40B. Execution cores 40A–40B are further connected to load/store unit 42, data cache 44, and PC silo and redirect unit 48. Load/store unit 42 is connected to PC silo and redirect unit 48, D-cache 44, and external interface unit 46. D-cache 44 is connected to register files 38, and external interface unit 46 is connected to an external interface 52. Elements referred to herein by a reference numeral followed by a letter will be collectively referred to by the reference numeral alone. For example, instruction queues 36A–36B will be collectively referred to as instruction queues 36.

Generally speaking, processor 10 includes a plurality of physical registers within register files 38A and 38B. Each rename register may be assigned to one of the following types of registers: (i) a floating point logical register; (ii) a multimedia logical register; (iii) an integer logical register and the flags logical register; or (iv) the flags logical register. Advantageously, each physical register may be available for use by each data type. Accordingly, code sequences which include a large number of instructions of a particular data type may make use of the entire set of rename registers, as opposed to an implementation in which separate sets of physical registers are provided for each data type. Performance may be increased due to the larger number of available physical registers, allowing more instructions to be outstanding within processor 10 prior to occupying all of the physical registers. In other words, the available physical register storage may be used more efficiently while executing an arbitrary mix of various data types.

In the present embodiment, processor 10 divides instructions into three groups: (i) floating point and multimedia instruction operations, which have a floating point or multimedia destination register; (ii) integer instruction operations with a register destination, which have the integer destination register as well as the flags register; and (iii) flags only instruction operations, which have the flags register as a destination (e.g. compare instructions and integer instructions having a memory destination instead of a register destination). Since integer instructions having a memory destination are referred to as "flags only" instruction operations herein, the term "integer instruction operation" will be used to refer to an integer instruction operation having a register destination.

For floating point and multimedia instruction operations, a physical register is assigned for the floating point or multimedia destination register. For integer instructions, a physical register is assigned for shared use by the integer destination register and the flags register. For flags only instructions, a physical register is assigned to the flags register. Advantageously, physical register storage may be even more efficiently used by sharing the same physical register between the integer destination register and the flags register.

It is noted that other embodiments may share physical registers among two or more data types in any desired combination, and remaining data types may be stored in separate physical registers, as desired. Generally, a data type refers to the definition of representation of the data (e.g. integer, floating point, multimedia, etc.). Knowledge of the data type allows proper interpretation of the bits comprising the data.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Line predictor 12 is configured to generate fetch addresses for I-cache 14 and is additionally configured to provide information regarding a line of instruction operations to alignment unit 16. Generally, line predictor 12 stores lines of instruction operations previously speculatively fetched by processor 10 and one or more next fetch addresses corresponding to each line to be selected upon fetch of the line. In one embodiment, line predictor 12 is configured to store 1K entries, each defining one line of instruction operations. Line predictor 12 may be banked into, e.g., four banks of 256 entries each to allow concurrent read and update without dual porting, if desired.

Line predictor 12 provides the next fetch address to I-cache 14 to fetch the corresponding instruction bytes. I-cache 14 is a high speed cache memory for storing instruction bytes. According to one embodiment I-cache 14 may comprise, for example, a 256 Kbyte, four way set associative organization employing 64 byte cache lines. However, any I-cache structure may be suitable. Additionally, the next fetch address is provided back to line predictor 12 as an input to fetch information regarding the corresponding line of instruction operations. The next fetch address may be overridden by an address provided by ITB 50 in response to exception conditions reported to PC silo and redirect unit 48.

The next fetch address provided by the line predictor may be the address sequential to the last instruction within the line (if the line terminates in a non-branch instruction). Alternatively, the next fetch address may be a target address of a branch instruction terminating the line. In yet another alternative, the line may be terminated by return instruction, in which case the next fetch address is drawn from return stack 22.

Responsive to a fetch address, line predictor 12 provides information regarding a line of instruction operations beginning at the fetch address to alignment unit 16. Alignment unit 16 receives instruction bytes corresponding to the fetch address from I-cache 14 and selects instruction bytes into a set of issue positions according to the provided instruction operation information. More particularly, line predictor 12 provides a shift amount for each instruction within the line instruction operations, and a mapping of the instructions to the set of instruction operations which comprise the line. An instruction may correspond to multiple instruction operations, and hence the shift amount corresponding to that instruction may be used to select instruction bytes into multiple issue positions. An issue position is provided for each possible instruction operation within the line. In one embodiment, a line of instruction operations may include up to 8 instruction operations corresponding to up to 6 instructions. Generally, as used herein, a line of instruction operations refers to a group of instruction operations concurrently issued to decode unit 24. The line of instruction operations progresses through the pipeline of microprocessor 10 to instruction queues 36 as a unit. Upon being stored in instruction queues 36, the individual instruction operations may be executed in any order.

The issue positions within decode unit 24 (and the subsequent pipeline stages up to instruction queues 36) define the program order of the instruction operations within the line for the hardware within those pipeline stages. An instruction operation aligned to an issue position by alignment unit 16 remains in that issue position until it is stored within an instruction queue 36A–36B. Accordingly, a first issue position may be referred to as being prior to a second issue position if an instruction operation within the first issue position is prior to an instruction operation concurrently within the second issue position in program order. Similarly, a first issue position may be referred to as being subsequent to a second issue position if an instruction operation within the first issue position is subsequent to instruction operation concurrently within the second issue position in program order. Instruction operations within the issue positions may also be referred to as being prior to or subsequent to other instruction operations within the line.

As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines. Furthermore, embodiments employing non-CISC instruction sets may employ a single instruction operation for each instruction (i.e. instruction and instruction operation may be synonymous in such embodiments). In one particular embodiment, a line may comprise up to eight instruction operations corresponding to up to 6 instructions. Additionally, the particular embodiment may terminate a line at less than 6 instructions and/or 8 instruction operations if a branch instruction is detected. Additional restrictions regarding the instruction operations to the line may be employed as desired.

The next fetch address generated by line predictor 12 is routed to branch history table 18, indirect address cache 20, and return stack 22. Branch history table 18 provides a branch history for a conditional branch instruction which may terminate the line identified by the next fetch address. Line predictor 12 may use the prediction provided by branch history table 18 to determine if a conditional branch instruction terminating the line should be predicted taken or not taken. In one embodiment, line predictor 12 may store a branch prediction to be used to select taken or not taken, and branch history table 18 is used to provide a more accurate prediction which may cancel the line predictor prediction and cause a different next fetch address to be selected. Indirect address cache 20 is used to predict indirect branch target addresses which change frequently. Line predictor 12 may store, as a next fetch address, a previously generated indirect target address. Indirect address cache 20 may override the next fetch address provided by line predictor 12 if the corresponding line is terminated by an indirect branch instruction. Furthermore, the address subsequent to the last instruction within a line of instruction operations may be pushed on the return stack 22 if the line is terminated by a subroutine call instruction. Return stack 22 provides the address stored at its top to line predictor 12 as a potential next fetch address for lines terminated by a return instruction.

In addition to providing next fetch address and instruction operation information to the above mentioned blocks, line predictor 12 is configured to provide next fetch address and instruction operation information to PC silo and redirect unit 48. PC silo and redirect unit 48 stores the fetch address and line information and is responsible for redirecting instruction fetching upon exceptions as well as the orderly retirement of instructions. PC silo and redirect unit 48.may include a circular buffer for storing fetch address and instruction operation information corresponding to multiple lines of instruction operations which may be outstanding within processor 10. Upon retirement of a line of instructions, PC silo and redirect unit 48 may update branch history table 18 and indirect address cache 20 according to the execution of a conditional branch and an indirect branch, respectively. Upon processing an exception, PC silo and redirect unit 48 may purge entries from return stack 22 which are subsequent to the exception-causing instruction. Additionally, PC silo and redirect unit 48 routes an indication of the exception-causing instruction to map unit 30, instruction queues 36, and load/store unit 42 so that these units may cancel instructions which are subsequent to the exception-causing instruction and recover speculative state accordingly.

In one embodiment, PC silo and redirect unit 48 assigns a sequence number (R#) to each instruction operation to identify the order of instruction operations outstanding within processor 10. PC silo and redirect unit 48 may assign R#s to each possible instruction operation with a line. If a line includes fewer than the maximum number of instruction operations, some of the assigned R#s will not be used for that line. However, PC silo and redirect unit 48 may be configured to assign the next set of R#s to the next line of instruction operations, and hence the assigned but not used R#s remain unused until the corresponding line of instruction operations is retired. In this fashion, a portion of the R#s assigned to a given line may be used to identify the line within processor 10. In one embodiment, a maximum of 8 ROPs may be allocated to a line. Accordingly, the first ROP within each line may be assigned an R# which is a multiple of 8. Unused R#s are accordingly automatically skipped.

The preceding discussion has described line predictor 12 predicting next addresses and providing instruction operation information for lines of instruction operations. This operation occurs as long as each fetch address hits in line predictor 12. Upon detecting a miss in line predictor 12, alignment unit 16 routes the corresponding instruction bytes from I-cache 14 to predictor miss decode unit 26. Predictor miss decode unit 26 decodes the instructions beginning at the offset specified by the missing fetch address and generates a line of instruction operation information and a next fetch address. Predictor miss decode unit 26 enforces any limits on a line of instruction operations as processor 10 is designed for (e.g. maximum number of instruction operations, maximum number of instructions, terminate on branch instructions, etc.). Upon completing decode of a line, predictor miss decode unit 26 provides the information to line predictor 12 for storage. It is noted that predictor miss decode unit 26 may be configured to dispatch instructions as they are decoded. In FIG. 1, this option is illustrated with a dotted line. Alternatively, predictor miss decode unit 26 may decode the line of instruction information and provide it to line predictor 12 for storage. Subsequently, the missing fetch address may be reattempted in line predictor 12 and a hit may be detected. Furthermore, a hit in line predictor 12 may be detected and a miss in I-cache 14 may occur. The corresponding instruction bytes may be fetched through external interface unit 46 and stored in I-cache 14.

In one embodiment, line predictor 12 and I-cache 14 employ physical addressing. However, upon detecting an exception, PC silo and redirect unit 48 will be supplied a logical (or virtual) address. Accordingly, the redirect addresses are translated by ITB 50 for presentation to line predictor 12 (and in parallel to I-Cache 14 for reading the corresponding instruction bytes). Additionally, PC silo and redirect unit 48 maintains a virtual lookahead PC value for use in PC relative calculations such as relative branch target addresses. The virtual lookahead PC corresponding to each line is translated by ITB 50 to verify that the corresponding physical address matches the physical fetch address produced by line predictor 12. If a mismatch occurs, line predictor 12 is updated with the correct physical address and the correct instructions are fetched. PC silo and redirect unit 48 further handles exceptions related to fetching beyond protection boundaries, etc. PC silo and redirect unit 48 also maintains a retire PC value indicating the address of the most recently retired instructions.

Decode unit 24 is configured to receive instruction operations from alignment unit 16 in a plurality of issue positions, as described above. Decode unit 24 decodes the instruction bytes aligned to each issue position in parallel (along with an indication of which instruction operation corresponding to the instruction bytes is to be generated in a particular issue position). Decode unit 24 identifies source and destination operands for each instruction operation and generates the instruction operation encoding used by execution cores 40A–40B. Decode unit 24 is also configured to fetch microcode routines from microcode unit 28 for instructions which are implemented in microcode.

According to one particular embodiment, the following instruction operations are supported by processor 10: integer, floating point add (including multimedia), floating point multiply (including multimedia), branch, load, store address generation, and store data. Each instruction operation may employ up to 2 source register operands and one destination register operand. According to one particular embodiment, a single destination register operand may be assigned to integer ROPs to store both the integer result and a condition code (or flags) update. The corresponding logical registers will both receive the corresponding PR# upon retirement of the integer operation. Certain instructions may generate two instruction operations of the same type to update two destination registers (e.g. POP, which updates the ESP and the specified destination register).

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Additionally, map unit 30 assigns a queue number (IQ#) to each instruction operation, identifying the location within instruction queues 36A–36B assigned to store the instruction operation. Map unit 30 additionally provides an indication of the dependencies for each instruction operation by providing queue numbers of the instructions which update each physical register number assigned to a source operand of the instruction operation. Map unit 30 updates map silo 32 with the physical register numbers and instruction to numbers assigned to each instruction operation (as well as the corresponding logical register numbers). Furthermore, map silo 32 may be configured to store a lookahead state corresponding to the logical registers prior to the line of instructions and an R# identifying the line of instructions with respect to the PC silo. Similar to the PC silo described above, map silo 32 may comprise a circular buffer of entries. Each entry may be configured to store the information corresponding one line of instruction operations.

Map unit 30 and map silo 32 are further configured to receive a retire indication from PC silo 48. Upon retiring a line of instruction operations, map silo 32 conveys the destination physical register numbers assigned to the line and corresponding logical register numbers to architectural renames block 34 for storage. Architectural renames block 34 stores a physical register number corresponding to each logical register, representing the committed register state for each logical register. The physical register numbers displaced from architectural renames block 34 upon update of the corresponding logical register with a new physical register number are returned to the free list of physical register numbers for allocation to subsequent instructions. In one embodiment, prior to returning a physical register number to the free list, the physical register numbers are compared to the remaining physical register numbers within architectural renames block 34. If a physical register number is still represented within architectural renames block 34 after being displaced, the physical register number is not added to the free list. Such an embodiment may be employed in cases in which the same physical register number is used to store more than one result of an instruction. For example, an embodiment employing the x86 instruction set architecture may provide physical registers large enough to store floating point operands. In this manner, any physical register may be used to store any type of operand. However, integer operands and condition code operands do not fully utilize the space within a given physical register. In such an embodiment, processor 10 may assign a single physical register to store both integer result and a condition code result of an instruction. A subsequent retirement of an instruction which overwrites the condition code result corresponding to the physical register may not update the same integer register, and hence the physical register may not be free upon committing a new condition code result. Similarly, a subsequent retirement of an instruction which updates the integer register corresponding to the physical register may not update the condition code register, and hence the physical register may not be free upon committing the new integer result.

Still further, map unit 30 and map silo 32 are configured to receive exception indications from PC silo 48. Lines of instruction operations subsequent to the line including the exception-causing instruction operation are marked invalid within map silo 32. The physical register numbers corresponding to the subsequent lines of instruction operations are freed upon selection of the corresponding lines for retirement (and architectural renames block 34 is not updated with the invalidated destination registers). Additionally, the lookahead register state maintained by map unit 30 is restored to the lookahead register state corresponding to the exception-causing instruction.

The line of instruction operations, source physical register numbers, source queue numbers, and destination physical register numbers are stored into instruction queues 36A–36B according to the queue numbers assigned by map unit 30. According to one embodiment, instruction queues 36A–36B are symmetrical and can store any instructions. Furthermore, dependencies for a particular instruction operation may occur with respect to other instruction operations which are stored in either instruction queue. Map unit 30 may, for example, store a line of instruction operations into one of instruction queues 36A–36B and store a following line of instruction operations into the other one of instruction queues 36A–36B. An instruction operation remains in instruction queue 36A–36B at least until the instruction operation is scheduled for execution. In one embodiment, instruction operations remain in instruction queues 36A–36B until retired.

Instruction queues 36A–36B, upon scheduling a particular instruction operation for execution, determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Instruction queues 36A–36B await the specified number of clock cycles (until the update will occur prior to or coincident with the dependent instruction operations reading the register file), and then indicate that instruction operations dependent upon that particular instruction operation may be scheduled. For example, in one particular embodiment dependent instruction operations may be scheduled two clock cycles prior to the instruction operation upon which they depend updating register files 38A–38B. Other embodiments may schedule dependent instruction operations at different numbers of clock cycles prior to or subsequent to the instruction operation upon which they depend completing and updating register files 38A–38B. Each instruction queue 36A–36B maintains the countdowns for instruction operations within that instruction queue, and internally allow dependent instruction operations to be scheduled upon expiration of the countdown. Additionally, the instruction queue provides indications to the other instruction queue upon expiration of the countdown. Subsequently, the other instruction queue may schedule dependent instruction operations. This delayed transmission of instruction operation completions to the other instruction queue allows register files 38A–38B to propagate results provided by one of execution cores 40A–40B to the other register file. Each of register files 38A–38B implements the set of physical registers employed by processor 10, and is updated by one of execution cores 40A–40B. The updates are then propagated to the other register file. It is noted that instruction queues 36A–36B may schedule an instruction once its dependencies have been satisfied (i.e. out of order with respect to its order within the queue).

Instruction operations scheduled from instruction queue 36A read source operands according to the source physical register numbers from register file 38A and are conveyed to execution core 40A for execution. Execution core 40A executes the instruction operation and updates the physical register assigned to the destination within register file 38A. Some instruction operations do not have destination registers, and execution core 40A does not update a destination physical register in this case. Additionally, execution core 40A reports the R# of the instruction operation and exception information regarding the instruction operation (if any) to PC silo and redirect unit 48. Instruction queue 36B, register file 38B, and execution core 40B may operate in a similar fashion.

In one embodiment, execution core 40A and execution core 40B are symmetrical. Each execution core 40 may include, for example, a floating point add unit, a floating point multiply unit, two integer units, a branch unit, a load address generation unit, a store address generation unit, and a store data unit. Other configurations of execution units are possible.

Among the instruction operations which do not have destination registers are store address generations, store data operations, and branch operations. The store address/store data operations provide results to load/store unit 42. Load/store unit 42 provides an interface to D-cache 44 for performing memory data operations. Execution cores 40A–40B execute load ROPs and store address ROPs to generate load and store addresses, respectively, based upon the address operands of the instructions. More particularly, load addresses and store addresses may be presented to D-cache 44 upon generation thereof by execution cores 40A–40B (directly via connections between execution cores 40A–40B and D-Cache 44). Load addresses which hit D-cache 44 result in data being routed from D-cache 44 to register files 38. On the other hand, store addresses which hit are allocated a store queue entry. Subsequently, the store data is provided by a store data instruction operation (which is used to route the store data from register files 38A–38B to load/store unit 42). Upon retirement of the store instruction, the data is stored into D-cache 44. Additionally, load/store unit 42 may include a load/store buffer for storing load/store addresses which miss D-cache 44 for subsequent cache fills (via external interface 46) and re-attempting the missing load/store operations. Load/store unit 42 is further configured to handle load/store memory dependencies.

Figure 2:
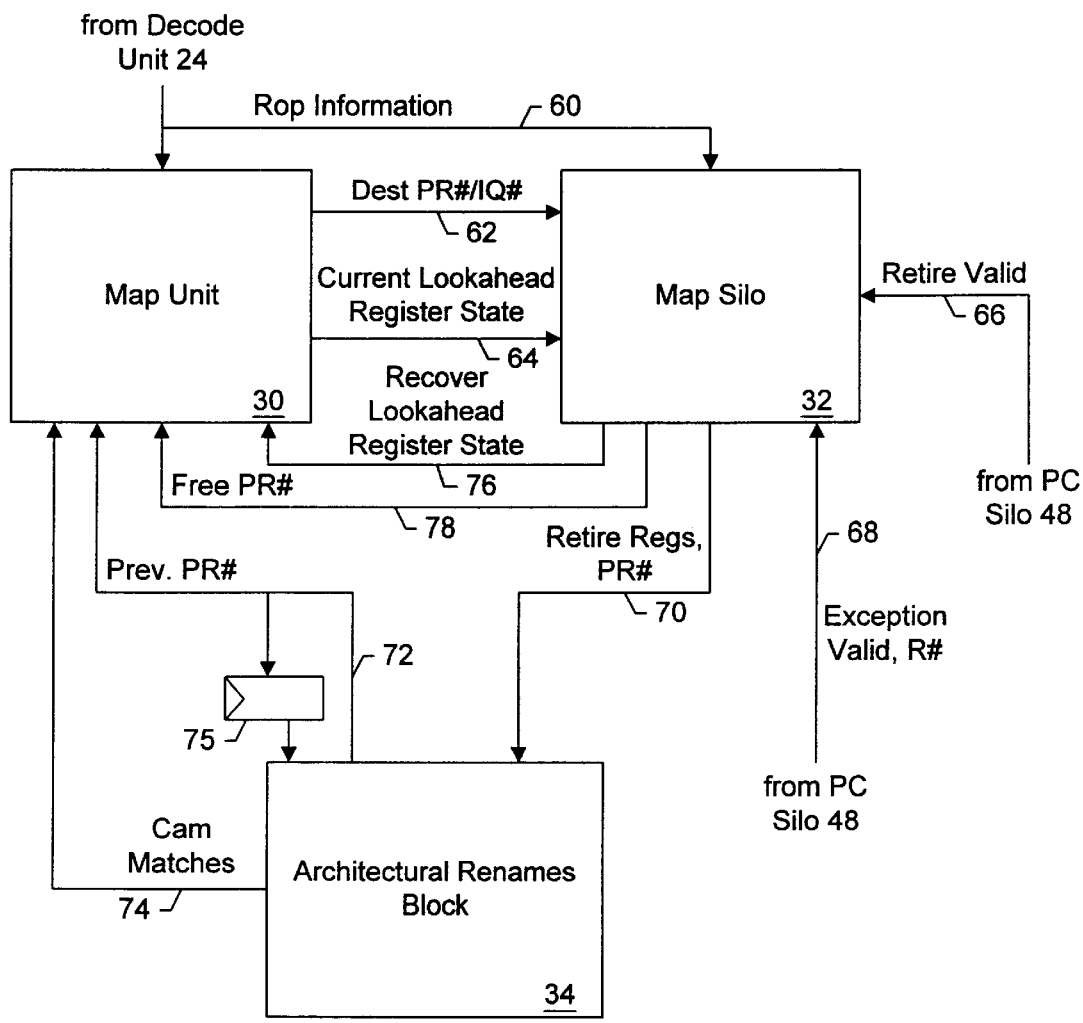
FIG. 2 is a block diagram of a map unit, a map silo, and an architectural renames block shown in FIG. 1, highlighting one embodiment of interconnection therebetween.

Turning now to FIG. 2, a block diagram of one embodiment of map unit 30, map silo 32, and architectural renames block 34 is shown to highlight interconnection therebetween according to one embodiment of processor 10. Other embodiments are possible and contemplated employing additional, substitute, or less interconnect, as desired.

Decode unit 24 is connected to an ROP information bus 60 which is further connected to both map unit 30 and map silo 32. Information regarding a line of instruction operations (or line of ROPs) is provided by decode unit 24 upon ROP information bus 60. For each ROP within the line, decode unit 24 provides at least the following: a valid indication, an indication of whether the ROP writes a destination register, an R#, a logical destination register number, and logical source register numbers (up to two). Map unit 30 assigns an IQ# to each ROP, and a destination PR# to each ROP which writes a destination register. Map unit 30 provides the assigned PR# and IQ# to map silo 32 upon a destination PR#/IQ# bus 62. Additionally, map unit 30 provides a current lookahead register state to map silo 32 upon a current lookahead register state bus 64. Generally, the term "lookahead register state" refers to identifying the state of the logical registers (i.e. the values stored therein) at a particular point in execution of a program sequence (i.e. subsequent to executing each instruction prior to the particular point in the program sequence and prior to executing each instruction subsequent to the particular point in the program sequence). The current lookahead register state identifies the set of physical registers which correspond to the logical registers prior to the line of ROPs being processed by map unit 30. In other words, the current lookahead register state stores the physical register number corresponding to each logical register. Additionally, in the present embodiment, the current lookahead register state includes the IQ# of the instruction which updates the identified physical register and a valid bit indicating whether or not the IQ# is still valid (i.e. the instruction has not yet been retired). Map silo 32 allocates an entry for the line of ROPs and stores the current lookahead register state and assigned PR#s and IQ#s provided by map unit 30. Additionally, map silo 32 may capture which ROPs are valid, which ROPs update logical registers, and which logical registers are updated by those ROPs from ROP information is bus 60.

Generally, a "silo" as referred to herein is a structure for storing information corresponding to an instruction, an instruction operation, or a line of instruction operations. The silo keeps the information in program order, and the information logically moves from the top of the silo (or the tail) to the bottom (or the head) of the silo as instructions are retired in program order (in the absence of exception conditions). As used herein, an instruction is retired when the result of the instruction is committed to architectural state (e.g. by allowing the update of architectural renames block 34 with the physical register number assigned to the destination of the instruction or by allowing the update of D-cache 44 with store data corresponding to the instruction).

Map silo 32 is connected to receive a retire valid signal upon a retire valid line 66 and a exception valid indication and R# upon an exception information bus 68. Retire valid line 66 and exception information bus 68 are connected to PC silo 48. In response an asserted retire valid signal, map silo 32 provides retired register information on a retire register/PR# bus 70 to architectural renames block 34 from the entry at the head of the silo. More particularly, retire register/PR# bus 70 may convey a logical register number to be updated and the corresponding physical register number. In the present embodiment, retirement of ROPs occurs concurrently for a full line (i.e. PC silo 48 signals retirement once each of the ROPs in the line at the head of PC silo 48 and map silo 32 have successfully executed). Accordingly, a signal to retire the oldest line may be used in the present embodiment. Other embodiments may provide for partial retirement or may organize storage via individual instruction operations, in which case retirement may occur by instruction operation, etc.

Architectural renames block 34, prior to updating entries corresponding to the logical registers specified on retire register/PR# bus 70, reads the current physical register numbers corresponding to those logical registers. In other words, the physical register numbers being displaced from architectural renames block 34 (the "previous physical register numbers") are popped out of architectural renames block 34. Architectural renames block 34 provides the previous PR#s on a previous PR# bus 72 which is connected to map unit 30 and updates the specified logical register entries with the PR# provided on retire register/PR# bus 70.

Generally, the previous PR#s are eligible to be added to the free list of PR#s (and for assignment to the destination register of a subsequent ROP). However, in the present embodiment, processor 10 employs a physical register sharing technique to improve the efficiency of physical register usage. For example, a physical register may be assigned to store both an integer value and a condition code value (or flags value). A portion of the physical register storage stores the integer value and another portion stores the condition code value. Accordingly, when a previous PR# is popped, for example, upon update of the integer register to which the PR# was assigned, the PR# may still represent the condition codes stored therein (and vice-versa). Architectural renames block 34 compares the previous PR# to the updated architectural state to determine which registers are actually eligible to be freed (represented in FIG. 2 by register 75 capturing the PR#s from previous PR# bus 72 and returning the captured numbers to architectural renames block 34, although other embodiments may accomplish the update and compare in one clock cycle). For example, architectural renames block 34 may employ a content addressable memory (CAM) for storing the PR#s corresponding to the logical registers. Architectural renames block 34 may convey a cam match signal upon a cam matches bus 74 corresponding to each PR# conveyed upon previous PR# bus 72. Map unit 30 may free the registers specified on previous PR# bus 72 if the corresponding cam match signal is not asserted. Advantageously, physical register usage may be more efficient and yet physical registers may be accurately freed. It is noted that, in other contemplated embodiments, separate physical registers may be assigned to each logical register updated in response to an instruction operation.

It is noted that, in the event that a previous PR# is not freed upon being popped from architectural renames block 34, a subsequent retirement of an instruction which updates the logical register which is still represented by the previous PR# may lead to the freeing of the previous PR#. Upon the subsequent retirement, a cam match may not be detected.

As used herein, a physical register is "free" if it is available for assignment to the destination operand of an instruction being processed by the renaming hardware. In the present embodiment, a physical register is freed upon retirement of a subsequent instruction updating the logical register to which the physical register is assigned. Other embodiments may free the register in alternative fashions.

It is noted that one or more instruction operations within a line may update the same logical register. Accordingly, one of map silo 32 or architectural renames block 34 includes logic to scan the logical registers being retired to identify the oldest update to each logical register (i.e. the last update, in program order) and stores the physical register number corresponding to that oldest update in architectural renames block 34. The newer updates may be freed similar to the above discussion (i.e. cammed and freed if no match occurs).

Map silo 32 may receive an exception indication from PC silo 48 as well. PC silo 48 may assert the exception valid signal and provide an R# of the instruction operation experiencing the exception to map silo 32 via exception information bus 68. Map silo 32 selects the silo entry corresponding to the line of ROPs including the instruction operation experiencing the exception (using the portion of the R# which is constant for each ROP in the line). Map silo 32 provides the current lookahead register state stored in the selected entry to map unit 30 upon recover lookahead register state bus 76. Map unit 30 restores the lookahead register state to the recovered state. Additionally, map silo 32 provides the logical register numbers, PR#s, and IQ#s of ROPs within the line but prior to the ROP experiencing the exception. Map unit 30 updates the restored lookahead state with the provided PR#s and IQ#s. Advantageously, the lookahead state is rapidly recovered. Instructions fetched in response to the exception condition may be renamed upon reaching map unit 30 due to the rapid recovery of the renames.

Additionally, in response to an exception, physical registers assigned to ROPs subsequent to the ROP experiencing the exception are freed. Map silo 32 conveys the PR#s to be freed upon a free PR# bus 78 to map unit 30. In one embodiment, map silo 32 may be configured to provide the PR#s to be freed at a rate of one line per clock cycle. Additionally, since the ROPs to which the physical registers were assigned were not retired, the physical registers need not be conveyed to architectural renames block 34 for camming.

Figure 3:
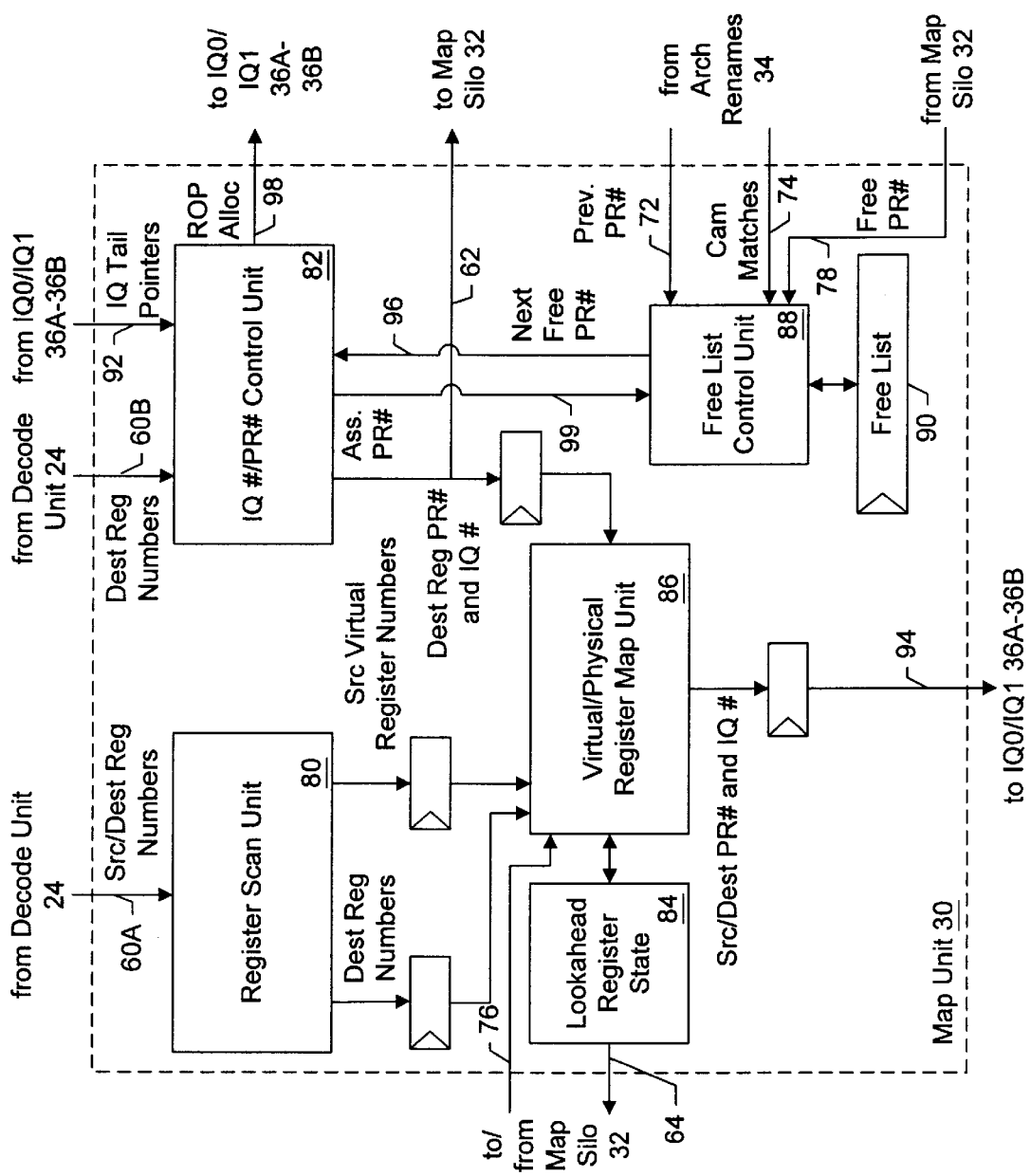
FIG. 3 is a block diagram of one embodiment of a map unit shown in FIGS. 1 and 2.

Turning now to FIG. 3, a block diagram of one embodiment of map unit 30 is shown. Other embodiments are possible and contemplated. In the embodiment of FIG. 3, map unit 30 includes a register scan unit 80, an IQ#/PR# control unit 82, a lookahead register state 84, a virtual/physical register map unit 86, a free list control unit 88, and a free list register 90. Register scan unit 80 is connected to receive source and destination logical register numbers (and a valid indication for each) from decode unit 24 upon bus 60A (a portion of ROP information bus 60 shown in FIG. 2). Register scan unit 80 is configured to pass the destination logical register numbers and source virtual register numbers to virtual/physical register map unit 86. IQ#/PR# control unit 82 is connected to a bus 60B (a portion of ROP information bus 60 shown in FIG. 2) to receive destination register numbers and valid indications corresponding to the destination register numbers. Instruction queues 36A–36B provide tail pointers upon tail pointers bus 92, indicating which entry in each queue is currently the tail of the queue. Additionally, IQ#/PR# control unit 82 is connected to destination PR#/IQ# bus 62. Virtual/physical register map unit 86 is connected to recover lookahead register state bus 76 and to lookahead register state 84, which is further connected to current lookahead register state bus 64. Still further, virtual/physical register map unit 86 is connected to provide source PR#s, source IQ#s, destination PR#s, and an IQ# for each ROP within the line upon a source/destination PR# and IQ# bus 94 to instruction queues 36A–36B. Free list control unit 88 is connected to IQ#/PR# control unit 82 via a next free PR# bus 96 and an assigned PR# bus 99, and is connected to free list register 90. Furthermore, free list control unit 88 is connected to previous PR# bus 72, cam matches bus 74, and free PR# bus 78.

In the embodiment of FIG. 3, map unit 30 performs register renaming using a two stage pipeline design. In the first stage, register scan unit 80 assigns virtual register numbers to each source register. In parallel, IQ#/PR# control unit 82 assigns IQ#s (based upon the tail pointers provided by instruction queues 36A–36B) to each ROP and PR#s to the ROPs which have a destination register. Since physical registers are capable of storing any data type in the present embodiment, IQ#/PR# control unit 82 assigns PR#s based on the presence or absence of a destination register for each ROP. Information regarding data types is not used. In the second stage, virtual/physical register map unit 86 maps the virtual register numbers to physical register numbers (based upon the current lookahead state and the assigned PR#s) and routes the physical register numbers assigned by IQ#/PR# control unit 82 to the issue position of the corresponding ROP.

The virtual register numbers assigned by register scan unit 80 identify a source for the physical register number. For example, in the present embodiment, physical register numbers corresponding to source registers may be drawn from either lookahead register state 84 (which reflects updates corresponding to the lines of ROPs previously processed by map unit 30) or from a previous issue: position within the line of ROPs (if the destination operand of the previous ROP is the same as the source operand . . . i.e. an intraline dependency exists). In other words, the physical register number corresponding to a source register number is the physical register number maintained by lookahead register state 84 unless an intraline dependency is detected. Register scan unit 80 effectively performs intraline dependency checking. Other embodiments may provide for other sources of source operands, as desired.

By separating intraline dependency checking/destination physical register assignment from physical register number mapping into pipeline stages, each stage may be operated at a higher frequency. Accordingly, the embodiment of map unit 30 shown in FIG. 3 may be operable at a higher frequency than other embodiments which perform intraline dependency checking and destination physical register assignment in parallel with determining source physical register numbers.

IQ#/PR# control unit 82 assigns instruction queue numbers beginning with the tail pointer of one of instruction queues 36A–36B. In other words, the first ROP within the line receives the tail pointer of the selected instruction queue as an IQ#, and other ROPs receive IQ#s in increasing order from the tail pointer. Control unit 82 assigns each of the ROPs in a line to the same instruction queue 36A–36B, and allocates the next line of ROPs to the other instruction queue 36A–36B. Control unit 82 conveys an indication of the number of ROPs allocated to the instruction queue 36A–36B via ROP allocated bus 98. The receiving instruction queue may thereby update its tail pointer to reflect the allocation of the ROPs to that queue.

Control unit 82 receives a set of free PR#s from free list control unit 88. The set of free PR#s are assigned to the destination registers within the line of instruction operations. In one embodiment, processor 10 limits the number of logical register updates within a line to four (i.e. if predictor miss decode unit 26 encounters a fifth logical register update, the line is terminated at the previous instruction). Hence, free list control unit 88 selects four PR#s from free list 90 and conveys the selected registers to control unit 82 upon next free PR# bus 96. Control unit 82 responds with which PR#s were actually assigned via assigned PR# bus 99, and free list control unit 88 deletes the assigned physical registers from the free list. Other embodiments may employ different limits to the number of updates within a line, including no limit (i.e. each ROP may update).

Free list control unit 88 is configured to manage the freeing of physical registers and to select registers for assignment to subsequent instructions. Free list register 90 may store, for example, a bit corresponding to each physical register. If the bit is set, the corresponding register is free. If the bit is clear, the corresponding register is currently assigned (i.e. not free). Free list control unit 88 scans the free list to select registers for conveyance to control unit 82. For example, free list control unit 88 may scan for the first two free registers from each end of free list register 90 to allow for rapid selection of the four registers provided in the present embodiment. These scans may be performed as two pick one operations from each end (one performed before the other and removing the assigned physical register from the free list).

Free list control unit 88 receives the previous physical register numbers popped from architectural renames block 34 via previous PR# bus 72. Subsequently, the cam match signals corresponding to each previous physical register number are received upon cam matches bus 74. Each previous PR# for which the corresponding cam match signal is deasserted is added to the free list by free list control unit 88. Additionally, physical register numbers received upon free PR# bus 78 are unconditionally added to the free list.

Lookahead register state 84 stores the lookahead register state prior to updates corresponding to the line of ROPs presented to virtual/physical register map unit 86. More particularly, lookahead register state 84 stores a physical register number corresponding to each logical register and (in the present embodiment) an instruction queue number corresponding to the ROP. having the physical register number assigned as a destination register. Each clock cycle, lookahead register state 84 conveys the current lookahead register state to map silo 32 upon current lookahead register state bus 64. Virtual/physical register map unit 86 supplies the PR# and IQ# of the corresponding logical register as indicated by lookahead register state 84 for each source register having a virtual register number indicating that the source of the PR# is lookahead register state 84. Source registers for which the virtual register number indicates a prior issue position are supplied with the corresponding PR# and IQ# assigned by control unit 82. Furthermore, virtual/physical register map unit 86 updates the lookahead register state 84 according to the logical destination registers specified by the line of ROPs and the destination PR#s/IQ#s assigned by control unit 82.

Virtual/physical register map unit 86 is further configured to receive a recovery lookahead register state provided by map silo 32 upon recovery lookahead register state bus 76 in response to an exception condition (as described above). Virtual/physical register map unit 86 may override the next lookahead register state generated according to inputs from register scan unit 80 and IQ#/PR# control unit 82 with the recovery lookahead state provided by map silo 32.

It is noted that, in the present embodiment, IQ#s are routed for each source operand to indicate which instruction queue entries the corresponding ROP is dependent upon. Instruction queues 36A–36B await. completion of the ROPs in the corresponding instruction queue entries before scheduling the dependent ROP for execution.

Figure 4:
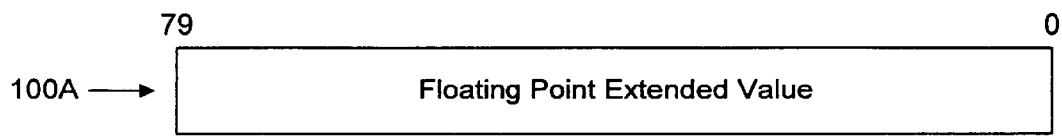
FIG. 4 is a diagram illustrating several data formats which are storable in physical registers within a register file shown in FIG. 1 according to one embodiment of the register file.
Figure 4:
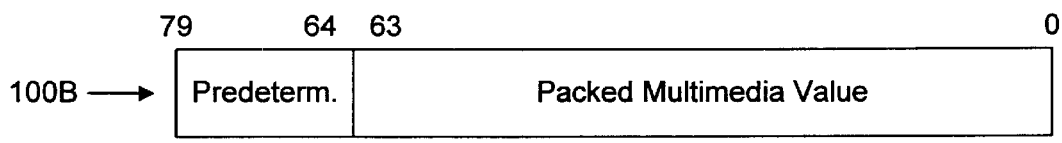
Figure 4:
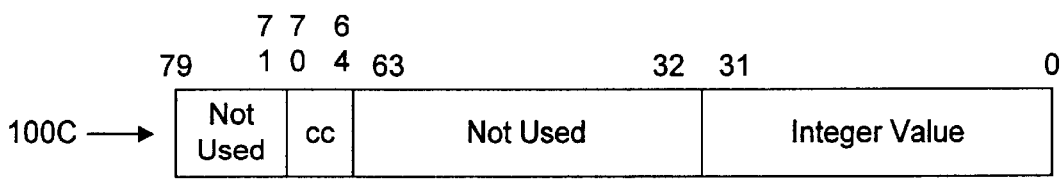
Figure 4:
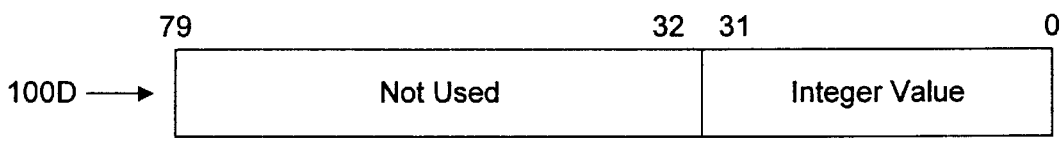
Figure 4:
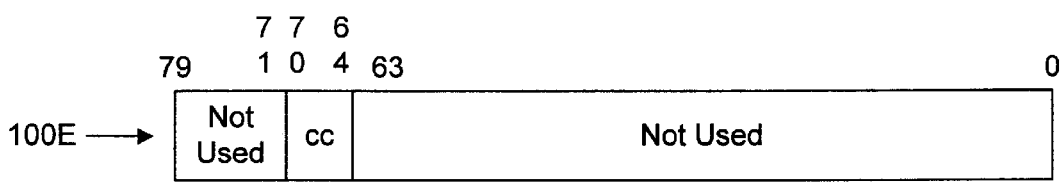

Turning next to FIG. 4, a diagram illustrating a variety of data formats 100A–100E. for a physical register within register files 38A–38B is shown. According to the present embodiment, any physical register within register files 38A–38B may be used to store data in any one of the data formats 100A–100E. Other embodiments are possible and contemplated. The embodiment shown in FIG. 4 illustrates an embodiment of processor 10 employing the x86 instruction set architecture. Other embodiments employing other architectures are contemplated, which may employing different sized registers than the ones illustrated via formats 100.

If the physical register is currently assigned to a floating point ROP, the physical register stores data according to data format 100A. In format 100A, the data within the physical register is interpreted as a floating point extended precision value. The floating point extended precision value includes a one bit sign, a 15 bit biased exponent, and a 64 bit significand including the implied bit to the left of the binary point. It is noted that additional bits of significand may be stored as desired to assist with proper rounding, etc.

If the physical register is currently assigned to a multimedia ROP, the physical register stores data according to data format 100B. In format 100B, a packed multimedia value is stored in a portion of the physical register and the remaining portion is set to a predetermined value. In the present embodiment, the multimedia registers are aliased to the floating point registers (i.e. they share the same architected registers) and the packed multimedia value is stored in the significand portion of the register. The sign and exponent portion is set to all ones. In other embodiments, architecturally separate registers may be defined. For such embodiments, the predetermined value portion of format 100B may not be used. In one embodiment, the packed multimedia value may comprise one of eight packed bytes, four packed words, two packed doublewords, or two packed single precision floating point values.

If the physical register is currently assigned to an integer ROP, one of the formats 100C–100D is used. The format used depends upon whether or not the ROP also updates the condition codes (or Flags). Each of formats 100C–100D includes an integer value portion which is stored into the least significant 32 bits of the physical register. Additionally, a condition code ("cc") field is assigned in format 100C to bits outside of the integer value field for storing the corresponding condition codes generated by execution of the integer instruction (e.g. bits 70:64 as shown in FIG. 4).

It is noted that, as defined in the x86 instruction set architecture, an integer operand may be a 32 bit value, a 16 bit value, or an eight bit value. Thirty-two bit registers are defined, with the 16 bit value occupying the least significant 16 bits of the register, and the 8 bit portion occupying either the least significant 8 bits or the next least significant eight bits. Processor 10 may treat integer values as 32 bit only and handle the smaller operand sizes via masking source operands and merging source data which is not modified by the instruction with the execution result generated by the instruction to generate the update for the destination operand.

If the physical register is currently assigned to a flags-only instruction, format 100E is used. In format 100E, the condition codes field is defined and the remainder of the register is not used.

Figure 5:
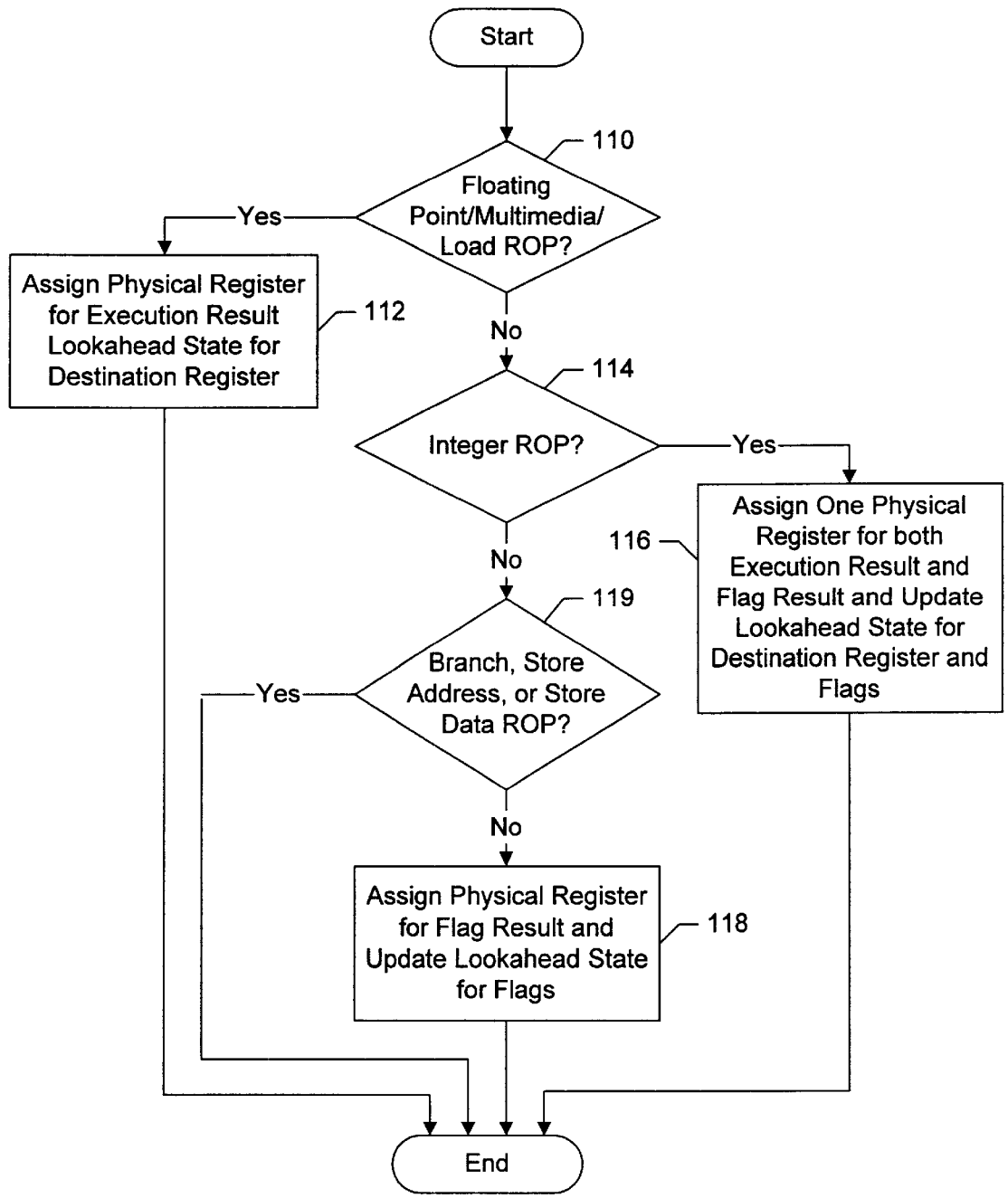
FIG. 5 is a flowchart illustrating assignment of a physical register to an instruction operation according to one embodiment of a map unit shown in FIG. 3.

Tuning now to FIG. 5, a flowchart is shown illustrating operation of one embodiment of map unit 30 in assigning physical registers for an ROP. Other embodiments are possible and contemplated. The steps shown in FIG. 5 are shown in a serial order for ease of understanding, but any suitable order may be used. Furthermore, combinatorial logic may implement steps in parallel as desired.

Map unit 30 examines each ROP to determine the instruction category to which the ROP belongs. If the ROP is floating point, multimedia, or load (decision block 110), then a physical register is assigned to the floating point, multimedia, or integer destination register of the instruction (step 112). Map unit 30 updates the lookahead register state for the logical destination register to the PR# corresponding to the assigned physical register. On the other hand, the ROP may be an integer ROP. If the ROP is an integer ROP (decision block 114), then the physical register is assigned to the integer destination register and to the destination condition codes (step 116). Map unit 30 updates the lookahead register state for the logical destination register and the flags register to the PR# corresponding to the assigned physical register. Still further, the ROP may be a type which does not include a destination register. In the present embodiment, for example, store address, store data, and branch ROPs do not include a destination register. If the ROP does not include a destination register (e.g. decision block 119), no physical register is assigned. Finally, if the ROP is a flags-only ROP, then the physical register is assigned for the flag result (step 118). Map unit 30 updates the lookahead register state for the flags register to the PR# corresponding to the assigned physical register.

As the above flowchart illustrates, a physical register from register files 38 may be assigned to any type of instruction according to the present embodiment. Accordingly, separate sets of physical registers for each type of register need not be provided. Additionally, physical register usage may be more efficient as the same physical register may represent both an integer register and the flags register. Register rename allocation may be simplified, in so far as that one physical register from one pool of physical registers is assigned for an instruction regardless of the type of instruction. As mentioned above, IQ#/PR# control unit 82 of the embodiment shown in FIG. 3 need not know the data type of a particular instruction to assign PR#s. Register scan unit 80, operating in parallel with IQ#/PR# control unit 82, uses the data type to properly assign virtual register numbers, and virtual/physical register map unit 86 routes PR#s and updates lookahead register state 84 according to the virtual register numbers. It is noted that certain instructions (e.g. POP) may have more than one integer register destination. Such instructions may be divided into multiple issue positions.

Figure 6:
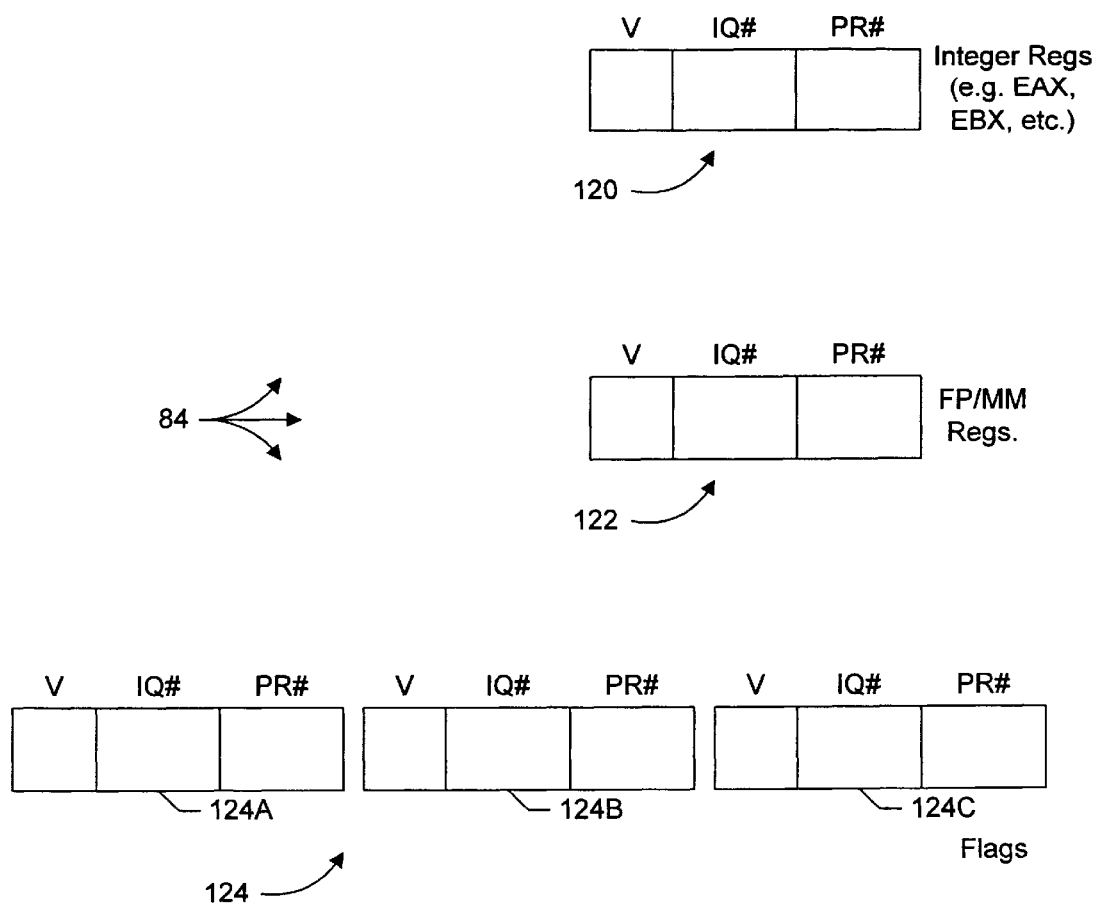
FIG. 6 is a diagram illustrating one embodiment of a lookahead state employed by one embodiment of a map unit shown in FIG. 3.

Turning next to FIG. 6, a diagram illustrating one embodiment of a portion of lookahead register state 84 is shown. Entries for each register type are shown. An integer entry 120 is shown, as well as a floating point/multimedia entry 122 and a flags entry 124. Other embodiments are possible and contemplated. The entries 120–124 may be used according to one embodiment of processor 10 employing the x86 instruction set architecture, for example.

Integer entry 120 includes a valid bit (V), an IQ#, and a PR# corresponding to a particular logical integer register. Accordingly, lookahead register state 84 includes entries similar to entry 120 for each logical integer register. The valid bit indicates whether or not the IQ# is valid. If the IQ# is valid, the number identifies the entry within instruction queues 36A–36B storing the ROP which is last to update the logical integer register (in program order). If the IQ# is not valid, then the value stored in the physical register indicated by the PR# is valid. The PR# indicates the physical register currently assigned to the logical integer register.

Similarly, floating point/multimedia entry 122 includes a valid bit (V), an IQ#, and a PR# corresponding to a particular floating point/multimedia register. Accordingly, lookahead register state 84 includes entries similar to entry 122 for each logical floating point/multimedia register.

Flags entry 124 is divided into three subentries 124A–124C, each having a corresponding valid bit, IQ#, and PR# similar to entries 120 and 122. The flags are divided into three groups, based upon their update by various instructions. If execution of a particular instruction updates one of the flags within a group, the remaining flags within that group are updated by execution of that instruction as well. A particular instruction may update more than one group of flags. Subentry 124A may correspond to the SF, OF, PF, and AF flags while subentry 124B may correspond to the CF flag and subentry 124C may correspond to the ZF flag.

It is noted that, in addition to the entries for integer register, floating point/multimedia registers, and flags register, lookahead register state entries may be included for the floating point condition code register, top of stack, and status register, as well as temporary registers used by microcode routines, etc.

Figure 7:
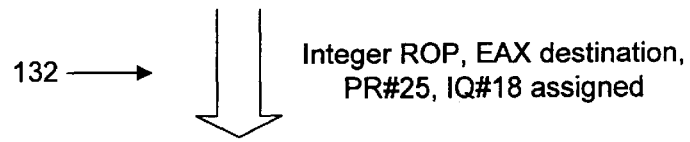
FIG. 7 is an example illustrating assignment of a physical register for an integer instruction operation.

Turning next to FIG. 7, an example illustrating assignment of an integer register rename is shown according to one embodiment of processor 10. Lookahead register state entries are shown for the EAX register, the FP0/MM0 register, and the Flags register in the example. An initial state of the illustrated entries is shown at reference numeral 130. Various IQ#s and PR#s are assigned to the EAX, FP0/MM0, and Flags registers. The valid indication is set to a binary one if the update corresponding to a particular logical register is pending, and is set to a binary zero if the update is not pending.

As illustrated at reference numeral 132, an integer ROP having EAX as a destination register is received. IQ#18 is assigned to the integer ROP. Additionally, physical register 25 (i.e. the physical register identified by a PR# of 25) is assigned to the destination of the integer ROP. The integer ROP in this example modifies each of the flags groups. Accordingly, the entry for EAX and the subentries for the Flags register are updated to indicate that PR# 25 is the current speculative copy of those registers and that PR# 25 is updated by the ROP in IQ#18 (reference numeral 134).

FIG. 7 illustrates the case in which the same physical register is used for both condition codes and integer results. Since the same physical register is used for both values, more efficient use of the physical register storage may be achieved. Additionally, fewer physical registers may be occupied at any given time, allowing more free physical registers to be used for other ROPs.

Figure 8:
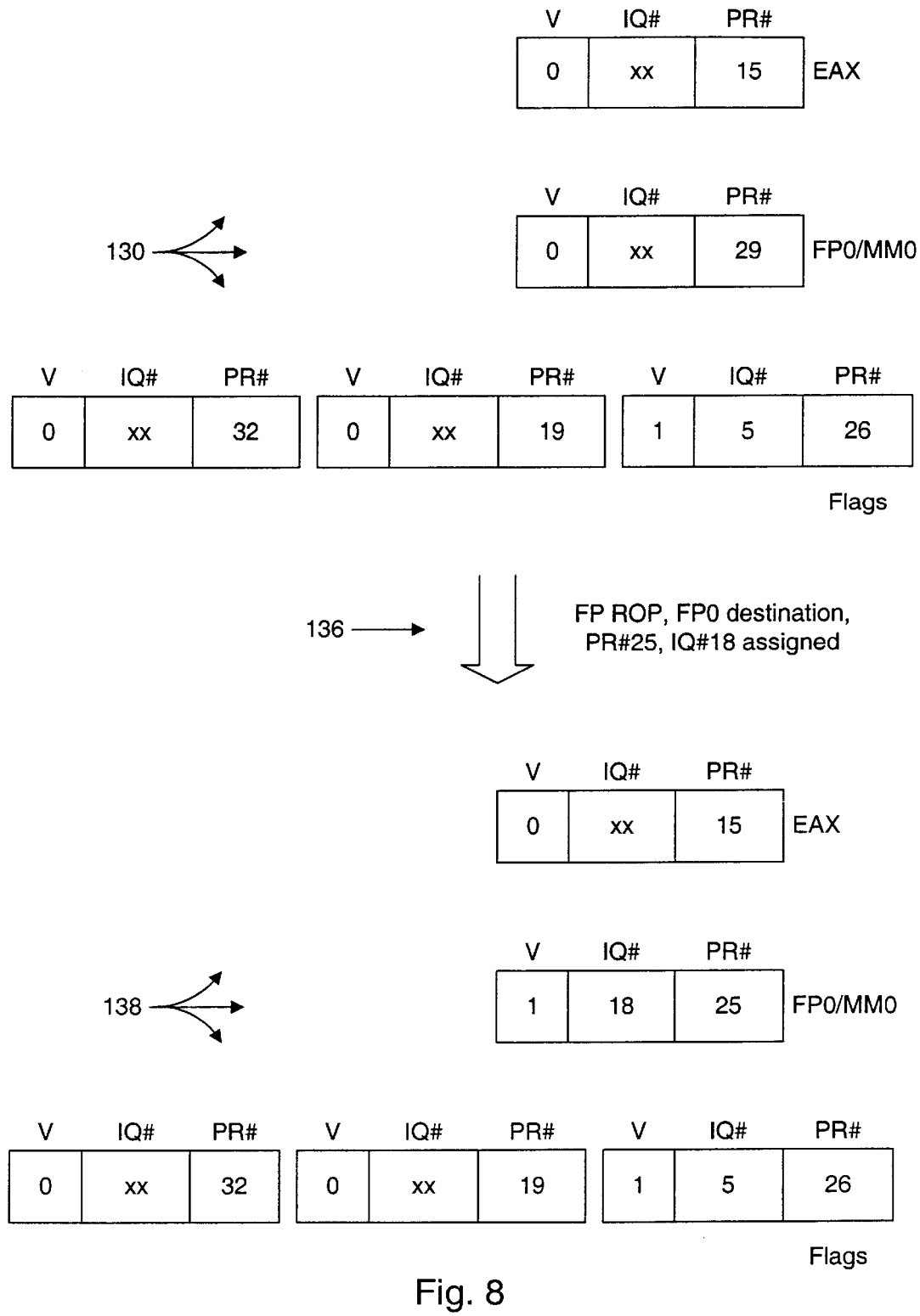
FIG. 8 is an example illustrating assignment of a physical register for a floating point or multimedia instruction operation.

Turning next to FIG. 8, an example illustrating assignment of a floating point/multimedia register rename is shown according to one embodiment of processor 10. Similar to FIG. 7, an initial lookahead register state is illustrated at reference numeral 130.

As illustrated at reference numeral 136, a floating point ROP having register FP0 as a destination is received. IQ# 18 is assigned to the floating point ROP, and PR# 25 is assigned to the destination. Accordingly, the lookahead register state entry for the FP0/MM0 register is updated to indicate that PR# 25 is the current speculative copy of that register and that PR# 25 is updated by the ROP in IQ# 18 (reference numeral 138).

Figure 9:
FIG. 9 is an example illustrating assignment of a physical register for a flags-only instruction operation.

Turning next to FIG. 9, an example illustrating assignment of a flags register rename is shown according to one embodiment of processor 10. Similar to FIG. 7, an initial lookahead register state is illustrated at reference numeral 130.

As illustrated at reference numeral 140, a flags-only ROP is received and PR# 25 is assigned to the destination. Additionally, IQ# 18 is assigned to the flags-only ROP. In this example, the flags-only ROP updates each of the flags groups. Accordingly, each of the subentries representing the Flags register are updated to indicated that PR# 25 is the current speculative copy of that register and that PR# 25 is updated by the ROP in IQ# 18 (reference numeral 142).

Figure 10:
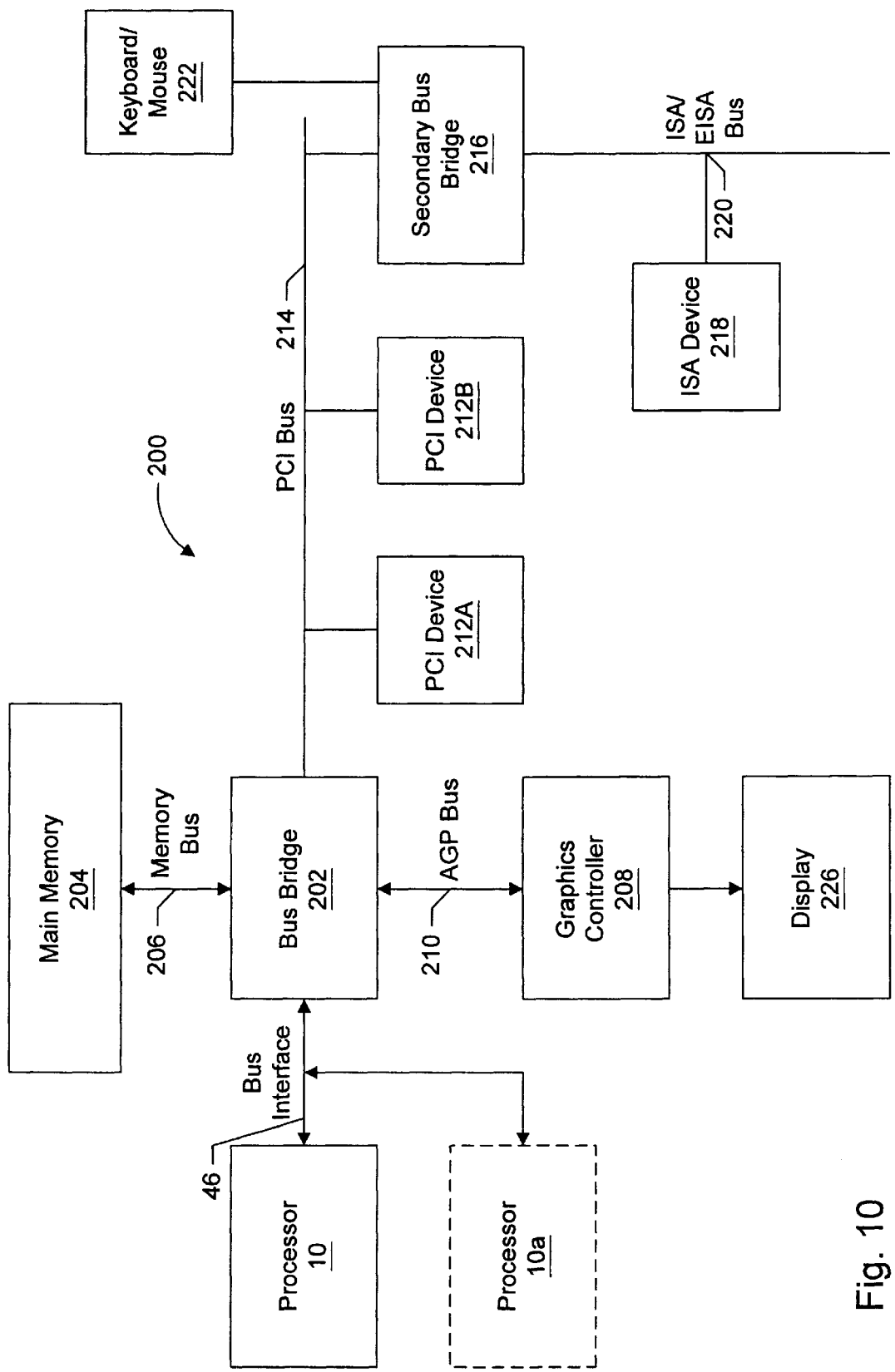
FIG. 10 is a block diagram of one embodiment of a computer system including the processor shown in FIG. 1.

Turning now to FIG. 10, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share bus interface 46 with processor 10 (as shown in FIG. 10) or may be connected to bus bridge 202 via an independent bus.

It is noted that, in various portions of the present specification, the x86 instruction set architecture was used. However, the present invention is not limited to the x86 instruction set architecture. Any instruction set architecture may be used, including, for example, the DEC Alpha, Power PC, MIPS, and SPARC instruction set architectures. Generally, any instruction set architecture which defines more than one register data type may achieve advantages from the present invention.

In accordance with the above disclosure, a processor has been showing which provides rename registers. Each rename register may be assigned to a floating point architected register, to a multimedia architected register, to an integer architected register and the flags architected register, or to the flags architected register. Advantageously, since many integer instructions also update the flags register, more efficient use of the register renames may be made by sharing the same rename register between the integer architected register and the flags architected register. Additionally, as opposed to an implementation in which separate rename registers are employed for floating point, multimedia, integer, and flags data types, the rename registers employed by the present processor are available to any data type. Accordingly, floating point or multimedia intensive code has access to all the rename register storage space (as opposed to only those designed for floating point or multimedia data). Similarly, integer intensive code has access to all the rename registers. More efficient use of the rename registers may be achieved in this fashion as well.

Numerous variations and modifications will become apparent to those skilled in the art once the above disclosure is fully appreciated. It is intended that the following claims be interpreted to embrace all such variations and modifications.

What is claimed is:

1. A processor comprising:
   a physical register capable of concurrently storing an integer value and a condition code; and
   a map unit coupled to receive an indication of a first instruction operation having an integer logical register and a condition code logical register as a destination, wherein the map unit is configured to generate a first mapping of the integer logical register to the physical register and a second mapping of the condition code logical register to the physical register.

2. The processor as recited in claim 1 wherein the map unit, in response to a second instruction operation having the condition code logical register as a destination and not the integer logical register as the destination, is configured to change the second mapping to a second physical register and to not change the first mapping.

3. The processor as recited in claim 1 wherein the condition code is divided into two or more groups, and wherein the second mapping includes separate submappings for each of the two or more groups.

4. The processor as recited in claim 3 wherein the map unit, in response to a third instruction operation which has a first group of the two or more groups as a destination but not a second group of the two or more groups, is configured to change a first submapping corresponding to the first group but not change a second submapping corresponding to the second group.

5. The processor as recited in claim 4 wherein the map unit, in response to a fourth instruction operation which has a first group and a second group as a destination, is configured to change a first submapping corresponding to the first group and a second submapping corresponding to the second group.

6. A computer system comprising:

a processor including a physical register capable of concurrently storing an integer value and a condition code, wherein the processor is configured, responsive to a first instruction operation having an integer logical register and a condition code logical register as a destination, to generate a first mapping of the integer logical register to the physical register and a second mapping of the condition code logical register to the physical register; and a peripheral device for communicating between the computer system and another computer system.

7. The computer system as recited in claim 6 wherein the processor, in response to a second instruction operation having the condition code logical register as a destination and not the integer logical register as the destination, is configured to change the second mapping to a second physical register and to not change the first mapping.

8. The computer system as recited in claim 6 wherein the condition code is divided into two or more groups, and wherein the second mapping includes separate submappings for each of the two or more groups.

9. The computer system as recited in claim 8 wherein the processor, in response to a third instruction operation which has a first group of the two or more groups as a destination but not a second group of the two or more groups, is configured to change a first submapping corresponding to the first group but not change a second submapping corresponding to the second group.

10. The computer system as recited in claim 9 wherein the processor, in response to a fourth instruction operation which has a first group and a second group as a destination, is configured to change a first submapping corresponding to the first group and a second submapping corresponding to the second group.

11. The computer system as recited in claim 6 wherein the peripheral device is a modem.

12. The computer system as recited in claim 6 further comprising a second processor including a second physical register capable of concurrently storing the integer value and the condition code, wherein the second processor is configured, responsive to a second instruction operation having the integer logical register and the condition code logical register as the destination, to map the integer logical register to the second physical register and the condition code logical register to the second physical register.

13. The computer system as recited in claim 6 wherein the peripheral device is an audio device.

14. The computer system as recited in claim 13 wherein the audio device includes a sound card.

15. A method comprising:

mapping an integer logical register to a physical register in response to a first instruction operation, the first instruction operation having the integer logical register and a condition code logical register as a destination, wherein the physical register is capable of concurrently storing an integer value and a condition code; and separately mapping the condition code logical register to the physical register in response to the first instruction operation.

16. The method as recited in claim 15 further comprising:

mapping the condition code logical register to a second physical register responsive to a second instruction operation having the condition code logical register as the destination and not the integer logical register as the destination; and not changing the mapping of the integer logical register responsive to the second instruction operation.

17. The method as recited in claim 15 wherein the condition code is divided into two or more groups, wherein the maping the condition code logical register comprises separately mapping each of the two or more groups.

18. The method as recited in claim 17 further comprising:

mapping a first group of the two or more groups to a second physical register in response to a third instruction operation which has the first group as a destination but not a second group of the two or more groups; and not mapping the second group to the second physical register in response to the third instruction operation.

19. The method as recited in claim 17 further comprising mapping both a first group of the two or more groups and a second group of the two or more groups to a second physical register in response to a fourth instruction operation which has the first group and the second group as the destination.

* * * * *